(12) United States Patent
Matsushita

(10) Patent No.: US 8,368,280 B2
(45) Date of Patent: Feb. 5, 2013

(54) CASE LID ASSEMBLY OF DC MOTOR WITH BRUSH

(75) Inventor: Ikuo Matsushita, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 294 days.

(21) Appl. No.: 12/747,367

(22) PCT Filed: Dec. 22, 2008

(86) PCT No.: PCT/JP2008/073274
§ 371 (c)(1),
(2), (4) Date: Jun. 10, 2010

(87) PCT Pub. No.: WO2009/084496
PCT Pub. Date: Jul. 9, 2009

(65) Prior Publication Data
US 2010/0270879 A1 Oct. 28, 2010

(30) Foreign Application Priority Data
Dec. 28, 2007 (JP) ................. 2007-339414

(51) Int. Cl.
H02K 23/66 (2006.01)
H02K 13/00 (2006.01)
(52) U.S. Cl. ........... 310/239; 310/71; 310/242; 310/249
(58) Field of Classification Search .................. 310/239, 310/71, 242, 249
See application file for complete search history.

(56) References Cited

U.S. PATENT DOCUMENTS

| | | | | |
|---|---|---|---|---|
| 4,673,837 A * | 6/1987 | Gingerich et al. | ............ | 310/239 |
| 4,926,075 A * | 5/1990 | Fushiya et al. | .................. | 310/50 |
| 5,129,740 A * | 7/1992 | Matsushita et al. | ........... | 384/441 |
| 5,294,851 A * | 3/1994 | Tajima et al. | ............... | 310/68 C |
| 5,600,193 A * | 2/1997 | Matsushima et al. | ....... | 310/68 C |
| 6,294,850 B1 | 9/2001 | Yui et al. | | |
| 6,300,696 B1 * | 10/2001 | Wong | .......................... | 310/68 R |
| 7,345,389 B2 * | 3/2008 | Furuki | ........................ | 310/68 C |
| 7,365,459 B2 * | 4/2008 | Bogdan et al. | .................. | 310/71 |
| 7,671,505 B2 * | 3/2010 | Yamamoto et al. | ........... | 310/239 |
| 2002/0047471 A1* | 4/2002 | Sik Lau | ........................ | 310/239 |
| 2004/0061412 A1* | 4/2004 | Ozawa et al. | ................. | 310/239 |
| 2005/0046302 A1* | 3/2005 | Suzuki et al. | ................. | 310/239 |
| 2005/0189829 A1* | 9/2005 | Thomson et al. | ............... | 310/71 |

(Continued)

FOREIGN PATENT DOCUMENTS
CN 1334633 2/2002
EP 863600 A2 * 9/1998

(Continued)

Primary Examiner — Quyen Leung
Assistant Examiner — Alex W Mok
(74) Attorney, Agent, or Firm — McGlew and Tuttle, P.C.

(57) ABSTRACT

A case lid assembly is formed by integrally fitting a brush holder formed of resin and a terminal holder formed of resin to opposite sides of a metal plate which supports a bearing. The brush holder supports a pair of brush bases. The terminal holder supports a PTC element and a pair of electrically conductive members. The electrically conductive members have receptacle terminals and brush base connection portions. Tip ends of the brush bases pass through the metal plate, and come into contact with the brush base connection portions of the electrically conductive members to thereby be electrically connected thereto. The PTC element is accommodated within a PTC element insertion portion of the brush holder which extends through the metal plate in a thrust direction.

16 Claims, 6 Drawing Sheets

U.S. PATENT DOCUMENTS

| | | | |
|---|---|---|---|
| 2005/0258691 A1* | 11/2005 | Furuki | 310/89 |
| 2006/0028090 A1* | 2/2006 | Machida | 310/239 |
| 2007/0090718 A1* | 4/2007 | Ozawa et al. | 310/245 |
| 2007/0159013 A1* | 7/2007 | Maruyama et al. | 310/51 |

FOREIGN PATENT DOCUMENTS

| | | |
|---|---|---|
| JP | 2-41663 | 3/1990 |
| JP | 2-41666 | 3/1990 |
| JP | 4-97456 | 8/1992 |
| JP | 07-107722 | 4/1995 |
| JP | 2000-224795 | 8/2000 |
| JP | 2002-44904 | 2/2002 |
| JP | 2003032966 A * | 1/2003 |
| JP | 2004229438 A * | 8/2004 |
| WO | WO 2006120934 A1 * | 11/2006 |
| WO | WO 2007062891 A1 * | 6/2007 |

* cited by examiner

BRUSH BASE

BRUSH

BRUSH BASE INSERTION PORTION

FIXATION BOSS

PTC ELEMENT INSERTION PORTION

BRUSH BASE

BRUSH

BRUSH BASE

BRUSH

CASE LID ASSEMBLY OF DC MOTOR WITH BRUSH

TECHNICAL FIELD

The present invention relates to a case lid assembly which is fitted into an opening portion of a motor casing of a DC motor with brushes, which accommodates a bearing for a shaft, and to which brushes are attached.

BACKGROUND ART

Motors for automotive electrical equipment, such as door lock motors, generally have a female terminal structure so as to facilitate incorporation and electrical connection. FIG. 9 is a view showing the structure of a case lid of a conventional motor described in Patent Document 1. As shown in FIG. 9, the case lid includes a pair of female terminals to which externally inserted external terminals are connected. The female terminals are united with first ends of a pair of electrically conductive members, and first ends of brush arms are connected to second ends of the electrically conductive members. Brushes are joined to second ends of the brush arms. One of the paired electrically conductive members is cut at an intermediate position into two pieces, and a PTC element is sandwiched and held between the pieces. The electrically conductive members, which have resiliency, are assembled into grooves provided in the case lid formed of resin; and external terminals inserted from the outside are brought into contact with the female terminals provided at the first ends thereof. Thus, a structure for supplying electricity to the motor is formed. Further, by means of inserting a PTC element between the pieces of one electrically conductive member, the PTC element is connected in series to a circuit for supplying electricity to the motor so as to cut off excessively large current, to thereby protect the motor from burnout.

However, since external terminals are inserted directly into the case lid, the case lid must have holes which extend from the outer surface thereof into the interior of the motor. If a foreign object, grease, or the like enters the interior of the motor through the holes, the motor becomes unable to rotate. Furthermore, since the electrically conductive members are complicatedly routed within the case lid, the shape of the case lid becomes complex, and misalignment of a bearing is likely to occur because of sinking or deformation of the resin. Moreover, since the external terminals are inserted directly into the interior of the motor, if the external terminals are inserted erroneously, the external terminals shave a resin portion in the interior. In such a case, shavings of the resin may lock a rotor of the motor, or may hinder the supply of electricity, to thereby render the motor inoperable.

FIG. 10 is a view showing the configuration of a conventional motor described in Patent Document 2. Since the motor shown in FIG. 10 is of a type in which male terminals are used as power supply terminals, the motor does not have through holes extending into the interior of the motor. A PTC element is accommodated and held within a recess of a motor lid plate, which is fixed to a motor casing by use of a pair of pins. However, in the case of a miniature motor whose cylindrical cross section is small, a sufficiently large PTC element cannot be used. A small PTC element has a problem in that its high internal resistance lowers motor torque, its trip time is excessively short, and it becomes unable to perform continuous operation in a door-lock application or the like.

FIG. 11 is a view showing the interior of a case lid of a conventional motor described in Patent Document 3. The motor shown in FIG. 11 is configured such that a PTC element can be externally inserted into an opening portion of the case lid, whereby the PTC element can be assembled to the motor. This structure facilitates insertion and exchange of the PTC element. However, since the PTC element is exposed to the outside, the PTC element is apt to be mechanically damaged or receive influences of the ambient environment, whereby the function of the PTC element may be impaired. In particular, if the PTC element is contaminated by oil and trips, its internal resistance increases, which lowers the torque of the motor, and eventually makes the motor inoperable.

Patent Document 1: Japanese Utility-Model Application Laid-Open (kokai) No. H2-41663
Patent Document 2: Japanese Utility-Model Application Laid-Open (kokai) No. H2-41666
Patent Document 3: Japanese Utility-Model Application Laid-Open (kokai) No. H4-97456

DISCLOSURE OF THE INVENTION

Problems to be Solved by the Invention

The present invention has been accomplished to solve the above-described problems. An object of the present invention is to enable employment of a female terminal structure which facilitates incorporation and electrical connection; to eliminate holes extending to the interior of a motor so as to prevent entry of a foreign object, grease, or the like and prevent the motor from becoming inoperable because of shavings of resin produced as a result of erroneous insertion of external terminals; and to secure accurate shaft alignment. Another object of the present invention is to secure a sufficiently large space for accommodating a large PTC element which has low internal resistance, does not lower motor torque, can have a proper trip time, and can perform continuous operation an increased number of times.

Means for Solving the Problems

A case lid assembly of a DC motor with brushes according to the present invention is fitted into an opening portion of a motor casing, and accommodates a bearing for a shaft. Brushes are attached to the case lid assembly. A brush holder formed of resin and a terminal holder formed of resin are integrally fitted to opposite sides, respectively, of a metal plate (isolation means) which supports the bearing. The brush holder supports a pair of brush bases connected to a pair of brushes; the terminal holder supports a PTC element and a pair of electrically conductive members; and each of the electrically conductive members has a receptacle terminal and a brush base connection portion. When the metal plate, the brush holder, and the terminal holder are fitted together, tip ends of the brush bases pass through the metal plate, and come into contact with the brush base connection portions of the electrically conductive members to thereby be electrically connected thereto; and the PTC element is accommodated within a PTC element insertion portion provided on the brush holder and extending through the metal plate in a thrust direction.

The brush holder includes brush base insertion portions extending through the metal plate; and the brush bases pass through the brush base insertion portions. The metal plate includes brush base fitting holes and a PTC element fitting hole which hold the brush base insertion portions and the PTC element insertion portion of the brush holder.

One of the pair of electrically conductive members directly connects the corresponding receptacle terminal and the corresponding brush base connection portion; and the other of the pair of electrically conductive members is configured such that the PTC element is inserted in series between the corresponding receptacle terminal and the corresponding brush base connection portion. The electrically conductive members are formed of a material having a resiliency, and establish electrical connection by means of pressing force produced thereby. The terminal holder includes a projection for fixing the motor.

Effects of the Invention

According to the present invention, since the metal plate (the insulating means) separates a motor internal area, in which the rotor which generates rotational force of the motor is provided, from an area into which the external terminals are inserted, holes which extend from the outside to the interior of the motor are not present. Therefore, the present invention has an effect of preventing entry of a foreign object, grease, or the like. Moreover, since the bearing is fixed to the metal plate, which separates the two spaces from each other, accurate shaft alignment can be attained. Further, even in the case where an erroneously inserted external terminal shaves a resin portion within the interior, shavings of resin do not make the motor inoperable, because the above-mentioned two areas are separated from each other.

Since the PTC element is protected within an independent accommodation space formed by the brush holder and the terminal holder, the PTC element is less likely to be affected by contamination by oil, mechanical damage, or ambient environment. Therefore, the function of the PTC element is not impaired. Moreover, since a sufficiently large PTC element can be accommodated within an accommodation space extending through the case lid in the thrust direction, the internal resistance of the PTC element can be lowered. Therefore, the problems of lowered motor torque, excessively short trip time, and becoming unable to perform continuous operation can be solved.

BEST MODE FOR CARRYING OUT THE INVENTION

Figure 1:
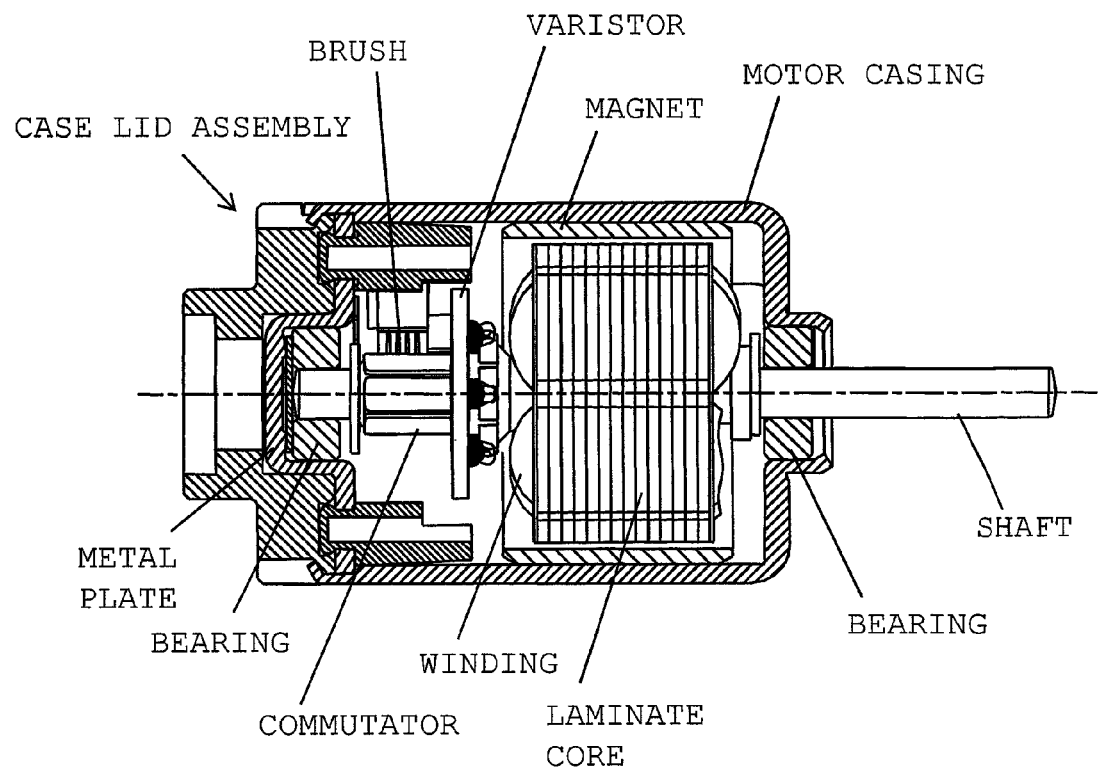
FIG. 1 is a longitudinal cross-sectional view of a miniature motor including a case lid assembly configured in accordance with the present invention.
Figure 2:
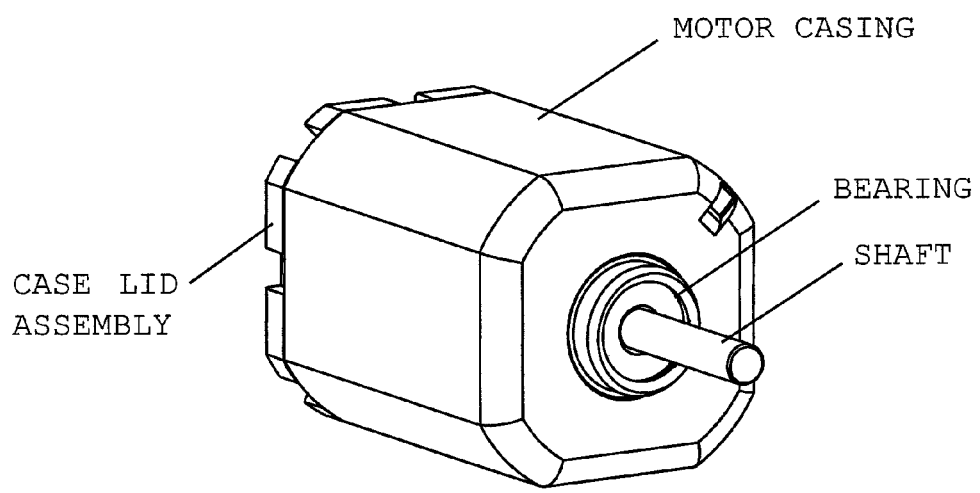
FIG. 2 is a perspective view showing the outside view of the miniature motor shown in FIG. 1.

The present invention will now be described by way of example. FIG. 1 is a longitudinal cross-sectional view of a miniature motor including a case lid assembly configured in accordance with the present invention. FIG. 2 is a perspective view showing the outside view of the miniature motor. FIGS. 1 and 2 exemplify a motor which has a quadrangle outer shape and which has a 4-pole magnetic field and six rotor poles. However, the present invention can be applied to a miniature motor which has any shape, any number of field poles, and any number of rotor poles, so long as the miniature motor is a DC motor with brushes. As illustrated, a magnet which forms field poles is attached to the inner circumferential surface of a motor casing, which is formed from a metallic material into a closed-bottomed tubular shape. A case lid assembly, which is the feature of the present invention and which will be described in detail later, is fitted into an opening portion of the motor casing.

A bearing for supporting one end of a shaft is provided at a central portion of a metal plate of the case lid assembly. The other end of the shaft is supported by a bearing provided at the center of a bottom portion of the closed-bottomed tubular motor casing. A laminate core, windings wound on the laminate core, and a commutator are usually provided on the shaft so as to constitute a rotor of the miniature motor. Furthermore, a varistor for quenching sparks is provided at an end of the commutator. As will be described in detail later, a pair of brushes in contact with the commutator are connected via brush bases and electrically conductive members to receptacle terminals for electrical connection with an external circuit.

Figure 3A:
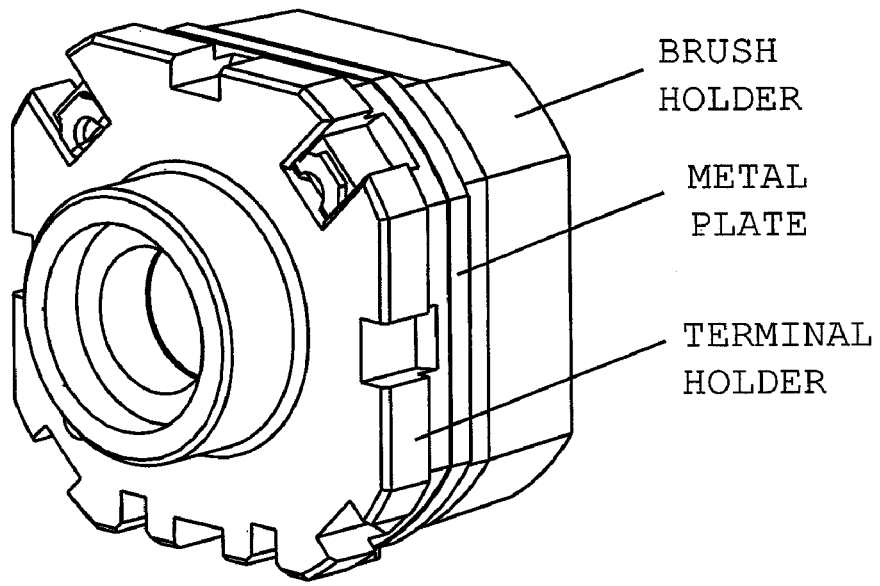
FIGS. 3(A) and 3(B) are perspective views of the same case lid assembly as viewed from different directions.
Figure 3B:
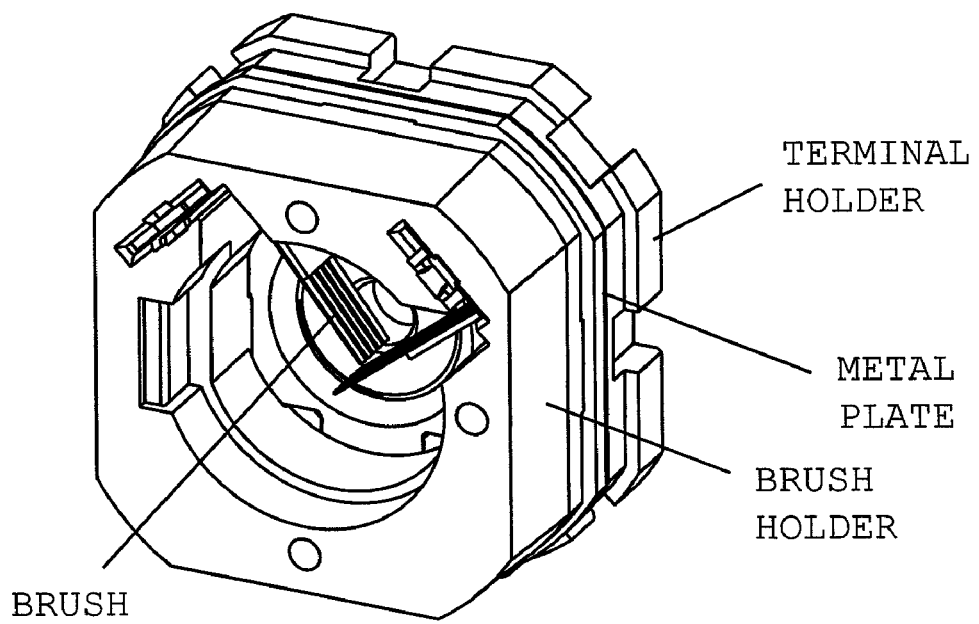

FIGS. 3(A) and 3(B) are perspective views of the same case lid assembly as viewed from different directions. The case lid assembly is formed through unitary assembly of the metal plate, a brush holder, and a terminal holder. The metal plate is located at the center of the assembly and supports the corresponding bearing. The brush holder is formed of resin, is located on one side of the metal plate, and supports the pair of brush bases. The terminal holder is located on the other side of the metal plate and supports a PTC element and the electrically conductive members. Below, elements which constitute the case lid assembly will be described on an element-by-element basis.

Figure 4A:
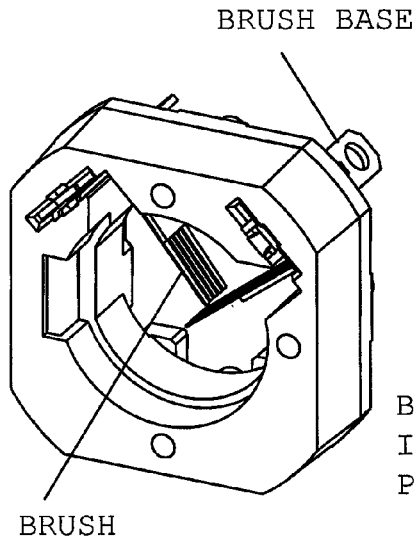
FIG. 4(A) is a perspective view of a brush holder with brushes and brush bases attached thereto.
Figure 4B:
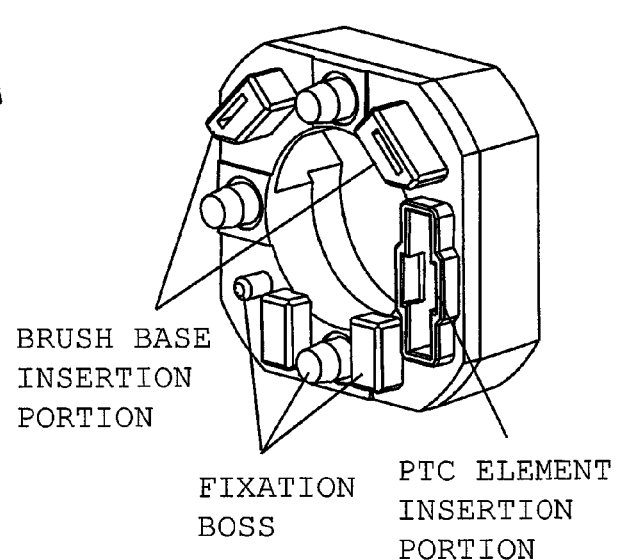
FIG. 4(B) is a perspective view of the brush holder only as viewed from the opposite side.
Figure 4C:
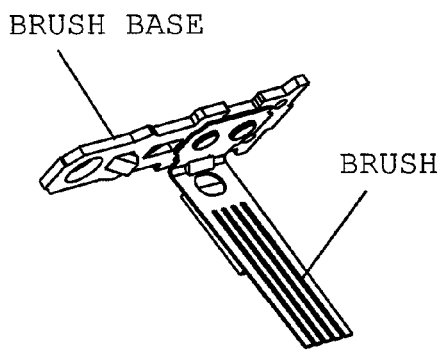
FIG. 4(C) is a perspective view of one brush and a corresponding brush base.
Figure 4D:
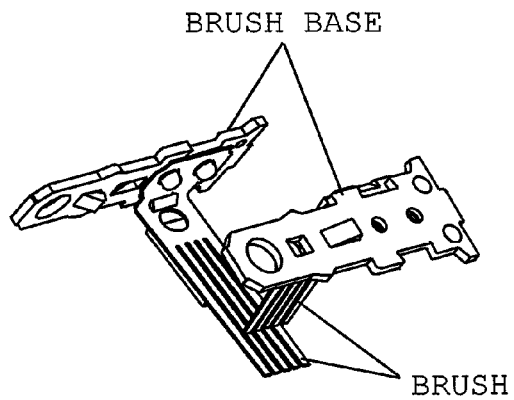
FIG. 4(D) is a perspective view of a pair of brushes and corresponding brush bases.

FIG. 4(A) is a perspective view of the brush holder with brushes and brush bases attached thereto, FIG. 4(B) is a perspective view of the brush holder only as viewed from the opposite side, FIG. 4(C) is a perspective view of one brush and a corresponding brush base, and FIG. 4(D) is a perspective view of a pair of brushes and corresponding brush bases. As shown in FIGS. 4(C) and 4(D), a pair of brushes (in the illustrated example, metal fork brushes) are connected to the corresponding brush bases by means of crimping or the like. As shown in FIG. 4(A), the brush bases are supported within recesses formed in the resin brush holder. In the illustrated example, the motor has a 4-pole magnetic field and six rotor poles, and, therefore, the paired brushes are disposed with a 90° interval therebetween. The brush bases pass through brush base insertion portions shown in FIG. 4(B), and are connected to brush base connection portions of the electrically conductive members within the terminal holder, which will be described later. As shown in FIG. 4(B), not only the brush base insertion portions, but also projecting portions, such as a PTC element insertion portion and fixation bosses, are provided on the brush holder. These projecting portions are fitted into corresponding holes provided in the metal plate, whereby the projecting portions close the corresponding holes of the metal plate and insulate, from the metal plate, the brush bases and the PTC element provided therein.

Figure 5A:
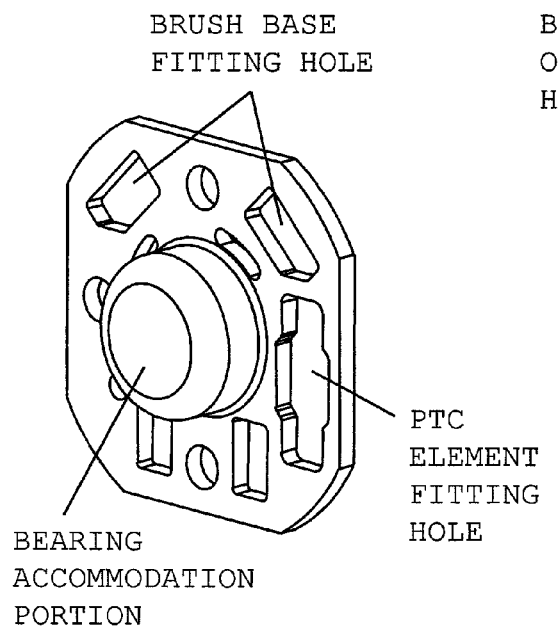
FIG. 5(A) and FIG. 5(B) are perspective views of the same metal plate as viewed from different directions.
Figure 5B:
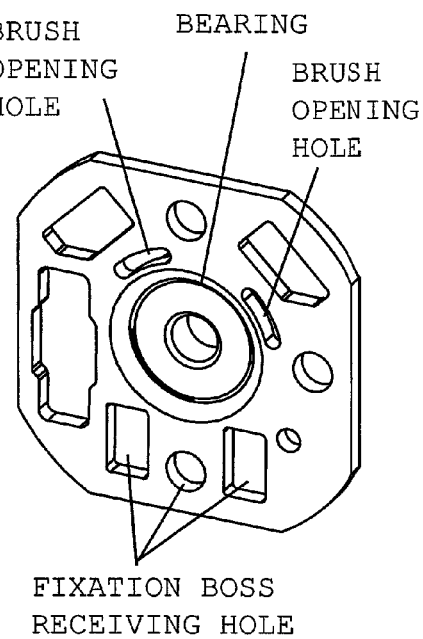

FIG. 5(A) and FIG. 5(B) are perspective views of the same metal plate as viewed from different directions. The metal plate not only supports the corresponding bearing, but also holds the brush base insertion portions and the PTC element insertion portion, which are integrally formed on the resin brush holder and are press-fitted into brush base fitting holes and a PTC element fitting hole of the metal plate. Moreover, the fixation bosses integrally formed on the resin brush holder are fitted into corresponding fixation boss receiving holes provided in the metal plate. When the metal plate is combined with the brush holder, all the holes provided in the metal plate, excluding a pair of brush opening holes, are closed by the corresponding projecting portions of the brush holder. The brush opening holes are closed by a surface of the terminal holder to be described later when the terminal holder, which will be described later, is combined.

Figure 6A:
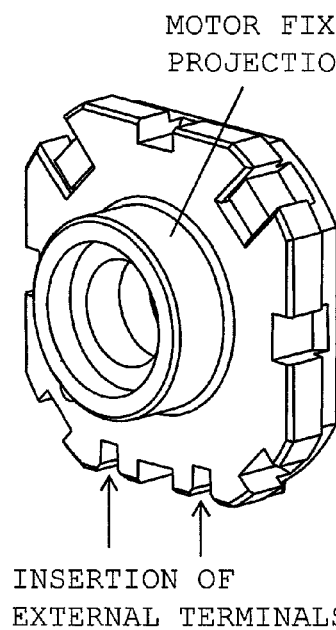
FIG. 6(A) and FIG. 6(B) are perspective views of the same terminal holder as viewed from different directions.
Figure 6B:
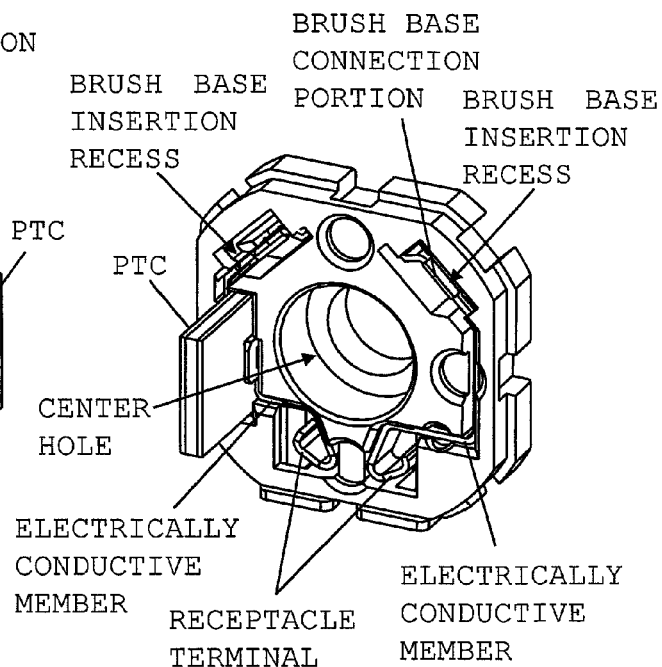

FIG. 6(A) and FIG. 6(B) are perspective views of the same terminal holder as viewed from different directions. The terminal holder formed of resin accommodates and holds the pair of electrically conductive members and the PTC element within corresponding recesses formed therein. The electrically conductive members are formed of a metal conductor having resiliency. Each of the electrically conductive members unitarily has a receptacle terminal (a female terminal) at one end and a brush base connection portion at the other end. The receptacle terminals of the electrically conductive members come into contact with external terminals (not shown) inserted from the outside, to thereby be electrically connected thereto. The brush base connection portions come into contact with tip end portions of the brush bases inserted into the brush base insertion recess, to thereby be electrically connected thereto. This connection is established by means of pressing by the electrically conductive members having resiliency. Whereas one of the paired electrically conductive members directly connects together the corresponding receptacle terminal and the corresponding brush base connection portion, the other electrically conductive member is configured such that the PTC element is inserted in series between the corresponding receptacle terminal and the corresponding brush base connection portion. Specifically, the other electrically conductive member is cut into two pieces, and is configured such that, when the PTC element is inserted into the PTC element insertion recess of the terminal holder, one of electrodes provided on opposite faces of the PTC element is connected to the receptacle terminal via one of the two pieces of the electrically conductive member, and the other electrode is connected to the brush base connection portion via the other piece of the electrically conductive member.

An end of the PTC element projecting from the terminal holder in the thrust direction extends into the PTC element insertion portion (FIG. 4(B)) of the brush holder inserted into the metal plate and is accommodated therein. Furthermore, the resin terminal holder has a center hole. The bearing accommodation portion of the metal plate is press-fitted into the center hole, whereby the terminal holder and the metal plate are fixed together. Moreover, on the side opposite the side where the bearing accommodation portion is press-fitted, the terminal holder has a motor fixation projection. This structure facilitates attachment of the motor into a device.

Figure 7:
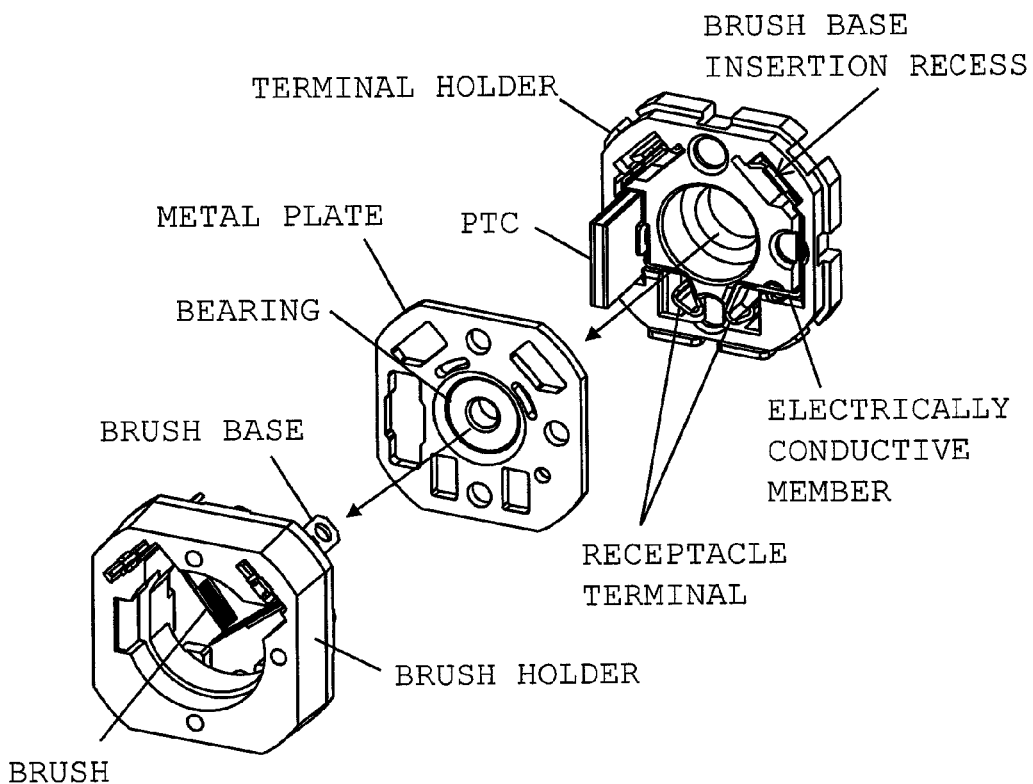
FIG. 7 is an explanatory view showing assembly of a case lid assembly.

FIG. 7 is an explanatory view showing assembly of a case lid assembly. The case lid assembly is constituted through unitary assembly of the resin brush holder supporting the pair of brush bases, the metal plate supporting the corresponding bearing, and the terminal holder supporting the PTC element and the electrically conductive members. The assembly of the case lid assembly is performed in the following sequence. First, the brush holder supporting the pair of brush bases and the metal plate supporting the corresponding bearing are fixedly fitted together. At that time, the fixation bosses, the brush base insertion portions, and the PTC element insertion portion of the brush holder are fitted into the fixation boss receiving holes, the brush base fitting holes, and the PTC element fitting hole of the metal plate, whereby the brush holder is fixed. Subsequently, after the rotor is inserted into the motor casing with magnets attached thereto, a subassembly composed of the brush holder and the metal plate fitted together is fitted into the opening portion of the motor casing. At that time, the subassembly is fitted in a state in which the pair of brushes are opened by use of a jig inserted through the brush opening holes provided in the metal plate. Finally, the terminal holder is fitted. At that time, the PTC element is inserted into the PTC element insertion portion (FIG. 4(B)) of the brush holder. Furthermore, the tip ends of the brush bases, which extend through the brush base insertion portions (FIG. 4(B)) of the brush holder, are inserted into the brush base insertion recesses formed in the terminal holder. Within the brush base insertion recesses, the tip ends of the brush bases come into contact with the brush base connection portions of the electrically conductive members, and are electrically connected thereto. Thus, electrical connection from the receptacle terminals to the brushes is completed. Notably, in the case where the PTC element is not required, an electrically conductive member configured to directly connect the receptacle terminal and the brush base connection portion is used for both the paired electrically conductive members.

Figure 8:
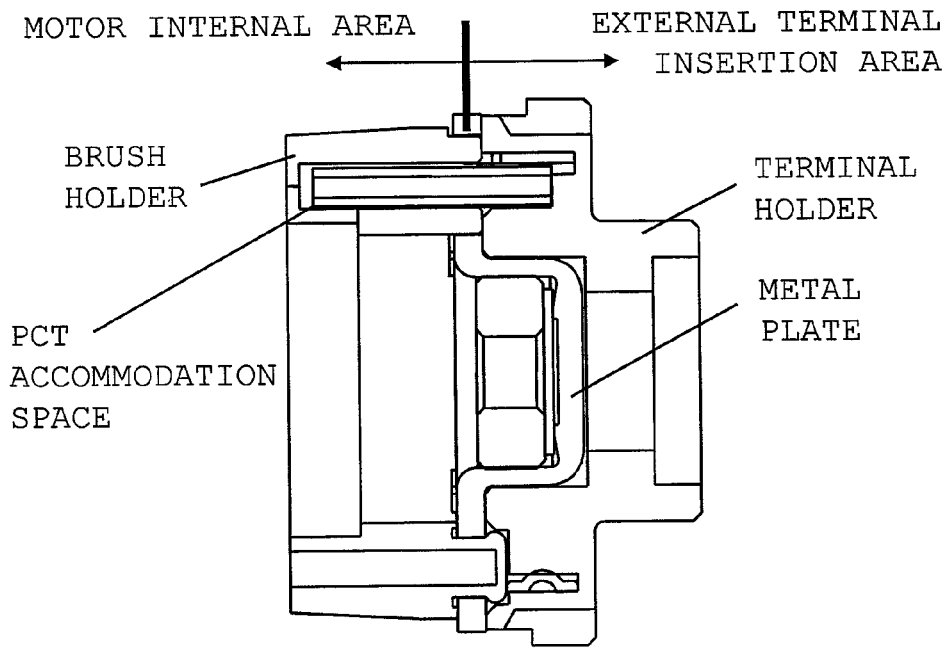
FIG. 8 is an explanatory view showing area separation of the case lid assembly.
Figure 9:
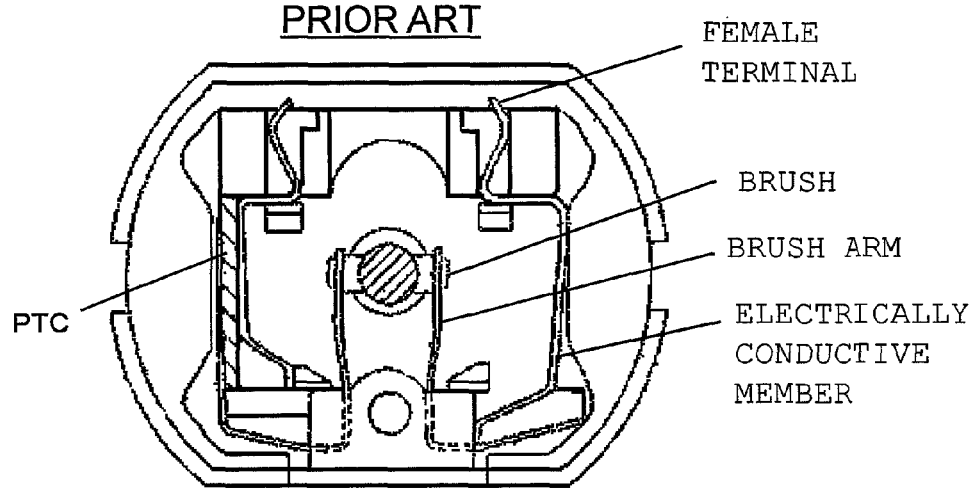
FIG. 9 is a view showing the structure of a case lid of a conventional motor described in Patent Document 1.
Figure 10:
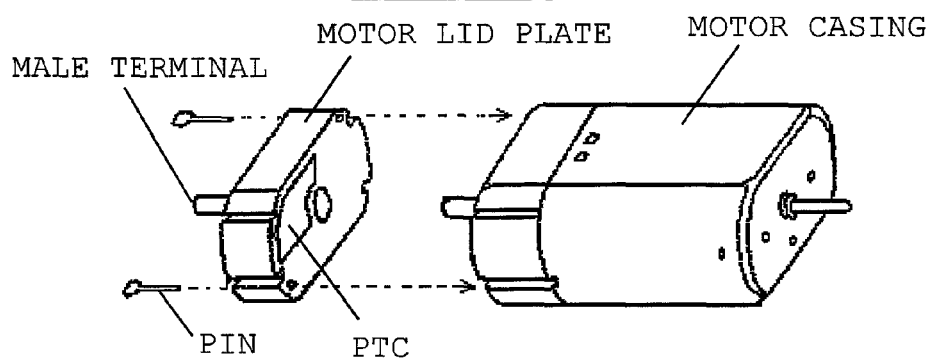
FIG. 10 is a view showing the structure of a conventional motor described in Patent Document 2.
Figure 11:
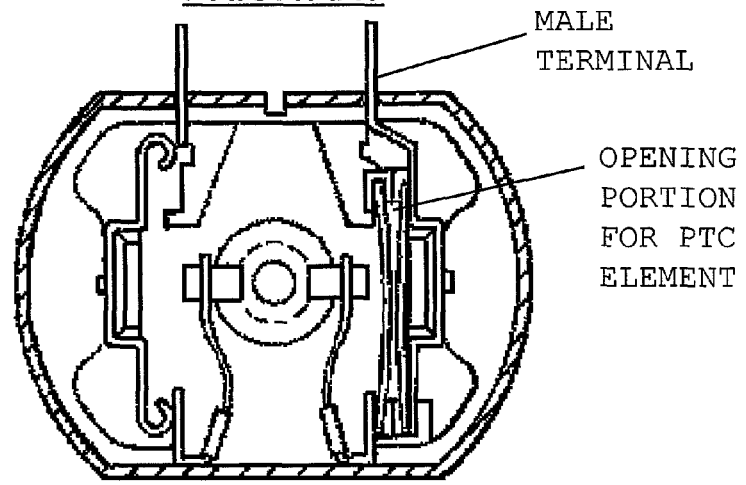
FIG. 11 is a view showing the interior of a case lid of a conventional motor described in Patent Document 3.

FIG. 8 is an explanatory view showing area separation of the case lid assembly. In the illustrated structure, the metal plate separates a motor internal area, in which the rotor which generates rotational force of the motor is provided, from an area into which the external terminals are inserted. Therefore, the holes which are provided in the terminal holder so as to receive external terminals inserted from the outside do not extend into the interior of the motor, and foreign objects, grease, or the like are less likely to enter the interior of the motor. Since the space for accommodating a PTC element extends through the metal plate in the thrust direction so that the space extends between the two areas, a sufficiently large PTC element can be provided. Thus, the internal resistance of the PTC element can be lowered. Moreover, since the corresponding bearing is fixed to the metal plate, which separates the two spaces from each other, accurate shaft alignment can be attained.

In the present disclosure, several embodiments have been described in detail as mere illustrative examples. However, the embodiments may be modified in various manners without substantially departing from the new teaching and advantageous effects of the present invention.

The invention claimed is:

1. A case lid assembly which is fitted into an opening portion of a motor casing of a DC motor with brushes, which accommodates a bearing for a shaft, and to which brushes are attached, the case lid assembly comprising:

a brush holder and a terminal holder integrally fixed to opposite sides, respectively, of isolation means which supports a bearing and which isolates a motor internal area and an external terminal area from each other, said brush holder supporting a pair of brush bases connected to a pair of brushes, the terminal holder supporting a PTC element and a pair of electrically conductive members, each of the electrically conductive members having a receptacle terminal and a brush base connection portion.

2. A case lid assembly of a DC motor with brushes according to claim 1, wherein, when the isolation means, the brush holder, and the terminal holder are fitted together, tip ends of the brush bases pass through the isolation means, and come into contact with the brush base connection portions of the electrically conductive members to thereby be electrically connected thereto; and the PTC element is accommodated within a PTC element insertion portion provided on the brush holder and extending through the isolation means in a thrust direction.

3. A case lid assembly of a DC motor with brushes according to claim 2, wherein the brush holder includes brush base insertion portions extending through the isolation means; and the brush bases pass through the brush base insertion portions.

4. A case lid assembly of a DC motor with brushes according to claim 3, wherein the isolation means includes brush base fitting holes and a PTC element fitting hole which hold the brush base insertion portions and the PTC element insertion portion of the brush holder.

5. A case lid assembly of a DC motor with brushes according to claim 4, wherein one of the pair of electrically conductive members directly connects the corresponding receptacle terminal and the corresponding brush base connection portion; and the other of the pair of electrically conductive members is configured such that the PTC element is inserted in series between the corresponding receptacle terminal and the corresponding brush base connection portion.

6. A case lid assembly of a DC motor with brushes according to claim 5, wherein the electrically conductive members are formed of a material having a resiliency, and establish electrical connection by means of pressing force produced thereby.

7. A case lid assembly of a DC motor with brushes according to claim 6, wherein the terminal holder includes a projection for fixing the motor.

8. A case lid assembly of a DC motor with brushes according to claim 7, wherein the isolation means is a metal plate.

9. A DC motor with brushes, the DC motor comprising:
a DC motor casing comprising an opening portion; and
a case lid assembly fitted into said opening portion of said motor casing, said case lid assembly accommodating a bearing for a shaft, and to which brushes are attached, wherein a brush holder and a terminal holder are integrally fixed to opposite sides, respectively, of isolation means which supports a bearing and which isolates a motor internal area and an external terminal area from each other, said brush holder supporting a pair of brush bases connected to a pair of brushes, said terminal holder supporting a PTC element and a pair of electrically conductive members, each of the electrically conductive members having a receptacle terminal and a brush base connection portion.

10. A DC motor with brushes according to claim 9, wherein:
when the isolation means, the brush holder, and the terminal holder are fitted together, tip ends of the brush bases pass through the isolation means, and come into contact with the brush base connection portions of the electrically conductive members to thereby be electrically connected thereto; and
the PTC element is accommodated within a PTC element insertion portion provided on the brush holder and extending through the isolation means in a thrust direction.

11. A DC motor with brushes according to claim 10, wherein:
the brush holder includes brush base insertion portions extending through the isolation means; and
the brush bases pass through the brush base insertion portions.

12. A DC motor with brushes according to claim 11, wherein the isolation means includes brush base fitting holes and a PTC element fitting hole which hold the brush base insertion portions and the PTC element insertion portion of the brush holder.

13. A DC motor with brushes according to claim 12, wherein one of the pair of electrically conductive members directly connects the corresponding receptacle terminal and the corresponding brush base connection portion; and the other of the pair of electrically conductive members is configured such that the PTC element is inserted in series between the corresponding receptacle terminal and the corresponding brush base connection portion.

14. A DC motor with brushes according to claim 13, wherein the electrically conductive members are formed of a material having a resiliency, and establish electrical connection by means of pressing force produced thereby.

15. A DC motor with brushes according to claim 14, wherein the terminal holder includes a projection for fixing the motor.

16. A DC motor with brushes according to claim 15, wherein the isolation means is a metal plate.

* * * * *